(12) United States Patent
Fujita et al.

(10) Patent No.: US 10,336,869 B2
(45) Date of Patent: Jul. 2, 2019

(54) CARBON FIBER-REINFORCED RESIN COMPOSITION AND SHAPED PRODUCT OBTAINED THEREFROM

(71) Applicant: MITSUI CHEMICALS, INC., Tokyo (JP)

(72) Inventors: Daisuke Fujita, Sodegaura (JP); Shuji Matsumura, Sodegaura (JP); Kenji Maki, Sodegaura (JP); Atsushi Takeishi, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/525,511

(22) PCT Filed: Nov. 13, 2015

(86) PCT No.: PCT/JP2015/081946
§ 371 (c)(1),
(2) Date: May 9, 2017

(87) PCT Pub. No.: WO2016/076411
PCT Pub. Date: May 19, 2016

(65) Prior Publication Data
US 2017/0321019 A1    Nov. 9, 2017

(30) Foreign Application Priority Data

Nov. 13, 2014 (JP) ................................. 2014-230275
Jun. 29, 2015 (JP) ................................. 2015-129721

(51) Int. Cl.
| | | |
|---|---|---|
| *C08J 5/04* | (2006.01) | |
| *C08K 7/06* | (2006.01) | |
| *C08L 53/00* | (2006.01) | |
| *C08L 77/00* | (2006.01) | |
| *C08L 23/12* | (2006.01) | |
| *C08L 23/16* | (2006.01) | |
| *C08L 23/08* | (2006.01) | |
| *C08L 23/10* | (2006.01) | |
| *C08L 51/06* | (2006.01) | |
| *C08L 77/02* | (2006.01) | |

(52) U.S. Cl.
CPC .................. *C08J 5/042* (2013.01); *C08J 5/04* (2013.01); *C08K 7/06* (2013.01); *C08L 23/0815* (2013.01); *C08L 23/10* (2013.01); *C08L 23/12* (2013.01); *C08L 23/16* (2013.01); *C08L 51/06* (2013.01); *C08L 53/00* (2013.01); *C08L 77/00* (2013.01); *C08L 77/02* (2013.01); *C08J 2323/10* (2013.01); *C08J 2323/16* (2013.01); *C08J 2423/08* (2013.01); *C08J 2423/26* (2013.01); *C08J 2477/00* (2013.01); *C08L 2205/02* (2013.01); *C08L 2205/035* (2013.01); *C08L 2205/16* (2013.01)

(58) Field of Classification Search
CPC ...... C08L 23/10; C08L 23/0815; C08L 23/12; C08L 23/16; C08L 77/00; C08L 77/02; C08L 51/06; C08L 53/00; C08L 2205/02; C08L 2205/16; C08L 2205/035; C08K 7/06; C08J 5/04; C08J 5/042; C08J 2423/10; C08J 2423/26; C08J 2423/16; C08J 2423/08; C08J 2477/00
See application file for complete search history.

(56) References Cited

U.S. PATENT DOCUMENTS

| | | | |
|---|---|---|---|
| 5,486,561 A * | 1/1996 | Hirano | ............ C08K 5/06 524/288 |
| 2012/0208019 A1 | 8/2012 | Sugiura et al. | |
| 2012/0238688 A1 | 9/2012 | Iwashita et al. | |
| 2012/0322935 A1 | 12/2012 | Atarashi | |

FOREIGN PATENT DOCUMENTS

| | | |
|---|---|---|
| CN | 103396611 A | 11/2013 |
| JP | 2005-256206 A | 9/2005 |
| JP | 2010-168526 A | 8/2010 |
| JP | 2011-016911 A | 1/2011 |
| JP | 2011016911 * | 1/2011 |
| JP | 2012-158648 A | 8/2012 |
| JP | 2013-001818 A | 1/2013 |
| JP | 2013-139507 A | 7/2013 |
| JP | 2014-156688 A | 8/2014 |
| JP | 2015-052102 A | 3/2015 |
| WO | WO-2011/030544 A1 | 3/2011 |

OTHER PUBLICATIONS

International Search Report issued in International Patent Application No. PCT/JP2015/081946 dated Dec. 22, 2015.
European Search Report dated May 31, 2017 in corresponding application No. 15858348.4.

\* cited by examiner

*Primary Examiner* — Robert S Jones
(74) *Attorney, Agent, or Firm* — Foley & Lardner LLP

(57) ABSTRACT

Disclosed are: a carbon fiber-reinforced resin composition excellent in properties such as strength and elastic modulus, comprising 100 parts by mass of a polymer alloy (A) which comprises: 25 to 95% by mass of one or more propylene-based polymers (p) selected from a propylene-ethylene block copolymer, a propylene homopolymer and a ropylene-ethylene random copolymer having an ethylene content of 5% by mass or less, 1 to 60% by mass of an acid-modified polyolefin resin (m), 0 to 40% by mass of an ethylene-based polymer (e) and 0 to 50% by mass of a polyamide (n) wherein the total of the component (p), the component (m), the component (e) and the component (n) is 100% by mass, and 1 to 200 parts by mass of a carbon fiber (B).

7 Claims, No Drawings

CARBON FIBER-REINFORCED RESIN COMPOSITION AND SHAPED PRODUCT OBTAINED THEREFROM

CROSS-REFERENCE TO RELATED APPLICATIONS

The present application is a U.S. national stage entry of International Patent Application No. PCT/JP2015/081946, filed Nov. 13, 2015, which claims the benefit of priority to Japanese Patent Application No. 2014-230275, filed Nov. 13, 2014, and Japanese Patent Application No. 2015-129721, filed Jun. 29, 2015, the entireties of which are hereby incorporated by reference.

TECHNICAL FIELD

The present invention relates to a carbon fiber-reinforced resin composition excellent in properties such as strength and elastic modulus, and a shaped product obtained therefrom.

BACKGROUND ART

In recent years, a carbon fiber-reinforced resin composition has been valuated as exhibiting excellent mechanical properties such as strength and rigidity in spite of its low specific gravity, and has drawn attention as an industrially important material. Particularly, in automobile components and aircraft components, a shaped product of a resin composition which is obtained by reinforcing with a carbon fiber a polyolefin resin excellent in rigidity and advantageous also in recycling property and high speed moldability has been drawing attention as alternative materials for metal materials and glass fiber-reinforced resin compositions. However, the shaped product has not become sufficiently popular as an alternative product for metal materials and glass fiber-reinforced resin compositions. The cause of this is that since a polyolefin resin is non-polar, its interface adhesion with the carbon fiber is poor and the carbon fiber cannot manifest the sufficient reinforcing effect, or since the carbon fiber itself is manufactured through a large amount of energy and a complicated manufacturing process, the shaped product is still expensive.

In order to improve interface adhesion between the polyolefin resin and the carbon fiber, for example, a method of adding an acid-modified polyolefin resin to a matrix resin (Patent document 1, for example), a method of adding a polyamide resin in addition to an acid-modified polyolefin resin (Patent document 2, for example), and a method of adding an acid-modified polyolefin resin and an amino group-containing modified polyolefin resin (Patent documents 3 and 4, for example) have been disclosed. However, in any method, the content of an expensive carbon fiber relative to the whole composition is high, or when the polyamide resin is used concurrently, the large amount of carbon fiber must be used for exhibiting strength under the conventional technical level and saving of the use amount of these materials is demanded. In addition, also in respect of strength, further improvement is demanded in the field of automobile and aircraft components.

RELATED ART DOCUMENTS

Patent Documents

Patent document 1: JP 2005-256206 A
Patent document 2: JP 2010-168526 A
Patent document 3: WO 2011/030544
Patent document 4: JP 2014-156688 A

SUMMARY OF INVENTION

Technical Problem

The present invention has been made in view of the above problems of the prior art, and an object thereof is to provide a carbon fiber-reinforced resin composition which is excellent in properties such as strength and elastic modulus even if a large amount of carbon fiber is not used or the polyamide content is small, and a shaped product obtained therefrom

Solution to Problem

The present invention features as follows:

[1] A carbon fiber-reinforced resin composition, comprising:
  100 parts by mass of a polymer alloy (A) which comprises:
    25 to 95% by mass of one or more propylene-based polymers (p) selected from a propylene-ethylene block copolymer, a propylene homopolymer and a propylene-ethylene random copolymer having an ethylene content of 5% by mass or less,
    1 to 60% by mass of an acid-modified polyolefin resin (m),
    0 to 40% by mass of an ethylene-based polymer (e) and
    0 to 50% by mass of a polyamide (n)
    wherein the total of the component (p), the component (m), the component (e) and the component (n) is 100% by mass, and
  1 to 200 parts by mass of a carbon fiber (B).

[2] The carbon fiber-reinforced resin composition according to said [1], wherein the composition comprises 100 parts by mass of the polymer alloy (A) and 1 to 80 parts by mass of the carbon fiber (B).

[3] The carbon fiber-reinforced resin composition according to said [1], wherein the melt flow rate (MFR) of the polymer alloy (A), measured at 230° C. under a load of 2.16 kg according to ASTM D1238, is 30 to 500 g/10 min.

[4] The carbon fiber-reinforced resin composition according to said [1], wherein the total of $W_p$ and $W_m$ is 50 to 100% by mass, $W_n$ is 0 to 50% by mass, and the ratio of Wp and Wm (Wp/Wm) is 70/30 to 98/2, in which the content of the component (p) is expressed by $W_p$% by mass, the content of the component (m) is expressed by $W_m$% by mass, the content of the component (e) is expressed by $W_e$% by mass, and the content of the component (n) is expressed by $W_n$% by mass in the polymer alloy (A), and the total of $W_p$, $W_m$, $W_e$ and $W_n$ is 100% by mass.

[5] The carbon fiber-reinforced resin composition according to said [1], wherein the acid-modified polyolefin resin (m) is one or more polymers selected from a maleic acid-modified propylene-based polymer (m1) and a maleic acid-modified ethylene-based polymer (m2).

[6] The carbon fiber-reinforced resin composition according to said [5], wherein the acid-modified polyolefin resin (m) comprises a maleic acid-modified propylene-based polymer (m1), and the melt flow rate (MFR) of the maleic acid-modified propylene-based polymer (m1), measured at 230° C. under a load of 2.16 kg according to ASTM D1238, exceeds 150 g/10 min.

[7] The carbon fiber-reinforced resin composition according to said [5], wherein the total of $W_p$ and $W_{m1}$ is 50 to 98% by mass, and $W_n$ is 2 to 50% by mass, in which the content of the component (p) is expressed by $W_p\%$ by mass, the content of the component (m1) is expressed by Wm1% by mass (the content of the whole component (m) is expressed by Wm % by mass), the content of the component (e) is expressed by $W_e\%$ by mass, and the content of the component (n) is expressed by $W_n\%$ by mass in the polymer alloy (A), and the total of Wp, Wm, We and Wn is 100% by mass, and additionally, the following formula (1) is satisfied in which the melt flow rate (MFR) of the component (p) measured at 230° C. under a load of 2.16 kg according to ASTM D1238 is expressed by $MFR_p$ (g/10 min) and the melt flow rate (MFR) of the component (m1) measured at 230° C. under a load of 2.16 kg according to ASTM D1238 is expressed by $MFR_{m1}$ (g/10 min):

$$Q_p \times \log(MFR_p) + Q_{m1} \times \log(MFR_{m1}) > \log 120 \quad (1)$$

wherein, $Q_p = W_p/(W_p + W_{m1})$, $Q_{m1} = W_{m1}/(W_p + W_{m1})$

[8] The carbon fiber-reinforced resin composition according to said [1], wherein the carbon fiber (B) is in the form of a carbon fiber bundle which has been sized using a sizing agent, and the sizing agent is an epoxy-based emulsion.

[9] A shaped product, which is obtained by molding the carbon fiber-reinforced resin composition according to said [1].

Advantageous Effects of Invention

According to the present invention, since adhesiveness and affinity between the carbon fiber (B) and the polymer alloy (A) consisting of a polypropylene-based resin are improved, even if a large amount of carbon fiber is not used or the polyamide content is small, physical properties (particularly, elastic modulus and impact resistance) of the resin composition can be improved. A shaped product obtained from the carbon fiber-reinforced resin composition of the present invention is suitable as a composite material for a structure of components which are required to have particularly rigidity and durability, such as automobile components and aircraft components.

Modes for Carrying Out the Intention

The carbon fiber-reinforced resin composition of the present invention is a carbon fiber-reinforced resin composition comprising 100 parts by mass of a polymer alloy (A) comprising 25 to 95% by mass of one or more propylene-based polymers selected from a propylene-ethylene block copolymer, a propylene homopolymer, and a propylene-ethylene random copolymer having an ethylene content of 5% by mass or less, 1 to 60% by mass of an acid-modified polyolefin resin (m), 0 to 40% by mass of an ethylene-based polymer (e) and 0 to 50% by mass of a polyamide (n), wherein the total of the component (p), the component (m), the component (e) and the component (n) is 100% by mass, as well as 1 to 200 parts by mass of a carbon fiber (B).

The content of the carbon fiber (B) with respect to 100 parts by mass of the polymer alloy (A) is within the range of 1 to 200 parts by mass, preferably 1 to 150 parts by mass, and is appropriately determined depending on the intended purpose of the carbon fiber-reinforced resin composition. When used as a material of a vehicle for movement a representative of which is an automobile, the content of the carbon fiber (B) is usually 1 to 100 parts by mass, preferably 1 to 90 parts by mass, more preferably 1 to 80 parts by mass with respect to 100 parts by mass of the polymer alloy (A), since it is necessary to exhibit lightweight properties and mechanical properties in a balanced manner. When applied to the civil engineering and construction field such as a tendon of the concrete, a cable of a suspension bridge and a steel frame alternative material, or the electric power field such as a power line core material, or when applied to components of general industrial machinery, since mechanical strength prevails over lightweight properties, the content of the carbon fiber (B) is 50 to 150 parts by mass, and preferably 60 to 140 parts by mass with respect to 100 parts by mass of the polymer alloy (A). In addition, also when the carbon fiber-reinforced resin composition is utilized as a master batch of general purpose polypropylene, the content of the carbon fiber (B) depends on the amount of a neat resin to be blended in a later step, and is generally 50 to 150 parts by mass with respect to 100 parts by mass of the polymer alloy (A).

The melt flow rate (MFR) of the polymer alloy (A) constituting the carbon fiber-reinforced resin composition of the present invention, measured at 230° C. under a load of 2.16 kg according to ASTM D1238, is preferably 30 to 500 g/10 minutes. A preferable MFR of the polymer alloy (A), measured at 230° C. under a load of 2.16 kg, is different depending on the contents of the polyamide (n) and the ethylene-based polymer (e) contained in the polymer alloy (A). That is, a preferable MFR is 40 to 200 g/10 minutes, and a more preferable MFR is 50 to 150 g/10 minutes, when the polymer alloy (A) does not contain the polyamide (n) and the ethylene-based polymer (e). On the other hand, a preferable MFR is 80 to 500 g/10 min, and a more preferable MFR is 100 to 350 g/10 min, when the polymer alloy (A) contains the polyamide (n) or the ethylene-based polymer (e).

The carbon fiber-reinforced resin composition of the present invention is usually obtained by melting and kneading the polymer alloy (A) and the carbon fiber (B) as described later, without being restricted to this process.

A preferable aspect in amounts of components or the ratio of components, of the polymer alloy (A) constituting the carbon fiber-reinforced resin composition of the present invention satisfies the following two requirements:

(Requirement 1) The total of $W_P$ and $W_m$ is 50 to 100% by mass, and $W_n$ is 0 to 50% by mass, in which the content of the component (p) is expressed by $W_p\%$ by mass, the content of the component (m) is expressed by $W_m\%$ by mass, the content of the component (e) is expressed by $W_e\%$ by mass, and the content of the component (n) is expressed by $W_n\%$ by mass in the polymer alloy (A), and the total of $W_p$, $W_m$, $W_e$ and $W_n$ is 100% by mass.

(Requirement 2) The ratio of $W_p$ and $W_m$ ($W_p/W_m$) is 70/30 to 98/2.

Furthermore, regarding the requirement 1, the polymer alloy (A) is classified into the following more preferable aspects.

One preferable aspect is the polymer alloy (A) in which the total of $W_p$ and $W_m$ is 100% by mass, $W_e$ is 0% by mass and $W_n$ is 0% by mass wherein the content of the component (p) is expressed by $W_p\%$ by mass, the content of the component (m) is expressed by $W_m\%$ by mass, the content of the component (e) is expressed by $W_e\%$ by mass and the content of the component (n) is expressed by $W_n\%$ by mass, and the total of $W_p$, $W_m$, $W_e$ and $W_n$ is 100% by mass.

In one preferable aspect, the total of $W_p$ and $W_m$ is 50 to 98% by mass, preferably 60 to 98% by mass, and more preferably 70 to 95% by mass, and $W_n$ is 2 to 50% by mass, preferably 2 to 40% by mass, and more preferably 5 to 30% by mass wherein the total of $W_p$, $W_e$, $W_m$ and $W_n$ is 100% by mass.

In one preferable aspect, as the acid-modified polyolefin resin (m), one or more resins selected from an acid-modified propylene-based polymer and an acid-modified ethylene-based polymer are used, more preferably, one or more resins selected from a maleic acid-modified propylene-based polymer (m1) and a maleic acid-modified ethylene-based polymer (m2) are used, further preferably, the acid-modified polyolefin resin (m) comprises the maleic acid-modified propylene-based polymer (m1), and the melt flow rate of the component (m1) ($MFR_{m1}$), measured at 230° C. under a load of 2.16 kg according to ASTM D1238, exceeds 150 g/10 min.

One preferable aspect is the polymer alloy (A) wherein the following relational formula (1), preferably the following relational formula (1'), more preferably the following relational formula (1''), particularly preferably the following relational formula (1''') is satisfied, in which the melt flow rate (MFR) of the component (p), measured at 230° C. under a load of 2.16 kg according to ASTM D1238, is expressed by $MFR_p$ (g/10 min) and the melt flow rate (MFR) of the component (m1), measured at 230° C. under a load of 2.16 kg according to ASTM D1238.

$$Q_p \times \log(MFR_p) + Q_{m1} \times \log(MFR_{m1}) > \log 120 \qquad (1)$$

$$Q_p \times \log(MFR_p) + Q_{m1} \times \log(MFR_{m1}) > \log 150 \qquad (1')$$

$$Q_p \times \log(MFR_p) + Q_{m1} \times \log(MFR_{m1}) > \log 160 \qquad (1'')$$

$$Q_p \times \log(MFR_p) + Q_{m1} \times \log(MFR_{m1}) > \log 180 \qquad (1''')$$

wherein, $Q_p = W_p/(W_p + W_{m1})$, $Q_{m1} = W_{m1}/(W_p + W_{m1})$

Various raw materials for preparing the polymer alloy (A) and the carbon fiber (B) will be illustrated below.

[Propylene-Based Polymer (p)]

In the present invention, the propylene-based polymer (p) is one or more polymers selected from a propylene-ethylene block copolymer, a propylene homopolymer and a propylene-ethylene random copolymer having an ethylene content of 5% by mass or less.

The propylene homopolymer or the propylene-ethylene random copolymer is obtained by polymerizing propylene alone or copolymerizing propylene and ethylene. In the present invention, when rigidity is stressed among mechanical properties of a shaped product obtained from the carbon fiber-reinforced resin composition, the propylene homopolymer is preferably used as the propylene-based polymer (p), and on the other hand, when impact resistance is stressed, the propylene-ethylene random copolymer is preferably adopted as the propylene-based polymer (p). When exhibition of both performances is wanted moderately, the propylene homopolymer and the propylene-ethylene random copolymer are used concurrently, in some cases. Specific conditions such as the blending ratio etc. thereupon are arbitrarily determined based on the balance between objective rigidity and impact resistance.

When the propylene-ethylene random copolymer is used as the propylene-based polymer (p), the ratio of the content of a structural unit derived from ethylene relative to the whole structural unit of the random copolymer exceeds 0 and is 5% by mass or less, and is preferably 1 to 5% by mass, and more preferably 1 to 4% by mass. When this content ratio exceeds 5% by mass, the resin composition becomes too soft, and strength of a shaped product is reduced in some cases. This content ratio can be measured by infrared spectroscopic analysis (IR) or NMR.

The propylene-ethylene block copolymer is preferably composed of a propylene homopolymer part and a propylene-ethylene random copolymer part. The content of the propylene-ethylene random copolymer part is usually 5 to 30% by mass, preferably 5 to 25% by mass, and more preferably 8 to 18% by mass, and the content of the propylene homopolymer part is usually 70 to 95% by mass, preferably 75 to 95% by mass, and more preferably 82 to 92% by mass. These contents are based on the total amount of 100% by mass of the propylene-ethylene random copolymer part and the propylene homopolymer part.

In the propylene-ethylene block copolymer, the content of a skeleton derived from ethylene is preferably 1 to 10% by mass, and more preferably 3 to 8% by mass.

In the present invention, the propylene-ethylene block copolymer can be used singly or in combination of two or more.

In the propylene-ethylene block copolymer, the MFR (230° C., load 2.16 kg) of the propylene homopolymer part is usually 2 to 1000 g/10 min, preferably 50 to 500 g/10 min, and more preferably 150 to 350 g/10 min. The intrinsic viscosity [η] of the propylene-ethylene random copolymer part, which is measured in decahydronaphthalene at 135° C., is usually 4 to 10 dl/g, and preferably 5 to 9 dl/g. In addition, the content of a structural unit derived from ethylene in the propylene-ethylene random copolymer part is usually 20 to 60 mol %, and preferably 30 to 50 mol %.

With regard to the MFR at 230° C. under a load of 2.16 kg, measured according to ASTM D1238, of the propylene-ethylene block copolymer, the propylene homopolymer or the propylene-ethylene random copolymer, the component (p) can be used without restriction over a wide range of its MFR value provided that the MFR of the polymer alloy (A) satisfies to be 30 to 500 g/10 min.

Usually, the MFR of the component (p) is 1 to 400 g/10 min, preferably 5 to 300 g/10 min, and more preferably 10 to 250 g/10 min. If the MFR is less than 1 g/10 min, the resin fluidity at molding is deteriorated, and the narrow spaces of carbon fibers may not be impregnated with the polymer alloy (A). On the other hand, if the MFR is greater than 400 g/10 min, it is not preferable because a shaped product does not exhibit sufficient mechanical strength in some cases.

In the present invention, the propylene-ethylene block copolymer, the propylene homopolymer or the propylene-ethylene random copolymer can be prepared by performing copolymerization in the presence of a known catalyst for olefin polymerization. As the catalyst for olefin polymerization, specifically, for example, a so-called Ziegler-Natta catalyst containing a solid titanium catalyst component and an organometallic compound catalyst component, or a metallocene catalyst can be used.

[Ethylene-based polymer (e)]

The ethylene-based polymer (e) is added in order to further improve mechanical characteristic typically including the impact resistance of a shaped product obtained from the carbon fiber-reinforced resin composition of the present invention. In addition, in the following description, the ethylene-based polymer (e) is abbreviated as a rubber component, in some cases.

The ethylene-based copolymer (e) is specifically an ethylene-based copolymer in which the content of a skeleton derived from ethylene (when homopolyethylene exists concurrently, the content of its skeleton is also included) is 50 mol % or more, preferably 60 mol % or more, and more preferably 70 mol % or more. Particularly, an ethylene-α-olefin copolymer is preferable, and a copolymer of ethylene and an α-olefin having 3 to 10 carbon atoms is more preferable. Examples of the α-olefin include propylene, 1-butene, 1-pentene, 1-hexene, 4-methyl-1-pentene, 3-methyl-1-pentene, 1-heptene, 1-octene, 1-nonene and 1-decene. One or more of them can be used. Among them, 1-butene and 1-octene are particularly preferable.

The MFR of the ethylene-based copolymer (e), measured at 230° C. under a load of 2.16 kg according to ASTM D-1238, is preferably 1 to 100 g/10 min, and more preferably 3 to 80 g/10 min, and the density thereof is preferably 0.86 to 0.92 g/cm$^3$. Specific conditions such as selection of an optimal species from these rubber components and the addition amount thereof are matters which are arbitrarily determined based on the balance between the desired rigidity and impact resistance.

[Polyamide (n)]

No specific restrictions are imposed on the kind of the polyamide (n). For example, amino acid lactams, or general melt-moldable polymers which are obtained by a melt polycondensation reaction between a diamine and a dicarboxylic acid can be used without restriction. Specifically, there are the following various resins.

(1) A polycondensate of an organic dicarboxylic acid having 4 to 12 carbon atoms with an organic diamine having 2 to 13 carbon atoms, for example, polyhexamethylene adipamide which is a polycondensate of hexamethylenediamine and adipic acid [6,6 nylon], polyhexamethylene azelamide which is a polycondensate of hexamethylenediamine and azelaic acid [6,9 nylon], polyhexamethylene sebacamide which is a polycondensate of hexamethylenediamine and sebacic acid [6,10 nylon], polyhexamethylene dodecanoamide which is a polycondensate of hexamethylenediamine and dodecanedioic acid [6,12 nylon], a semi-aromatic polyamide which is a polycondensate of an aromatic dicarboxylic acid and an aliphatic diamine (PA6T, PA9T, PA10T, PA11T), and polybis(4-aminocyclohexyl)methane-dodecane which is a polycondensate of bis-p-aminocyclohexyl-methane and dodecanedioic acid. Specific examples of the organic dicarboxylic acid include adipic acid, pimelic acid, suberic acid, phthalic acid, terephthalic acid, isophthalic acid, naphthalenedicarboxylic acid, phenylenedioxydiacetic acid, oxydibenzoic acid, diphenylmethanedicarboxylic acid, diphenylsulfone-dicarboxylic acid, biphenyldicarboxylic acid, sebacic acid and dodecanedioic acid. Specific examples of the organic diamine include hexamethylenediamine, octamethylenediamine, nonanediamine, octanediamine, decanediamine, undecadiamine, undecanediamine and dodecanediamine.

(2) A polycondensate of an ω-amino acid, for example, polyundecane-amide which is a polycondensate of ω-aminoundecanoic acid [11 nylon].

(3) A ring-opened polymer of a lactam, for example, polycapramide which is a ring-opened polymer of ε-aminocaprolactam [6 nylon], polylauri-clactam which is a ring-opened polymer of ε-aminolaurolactam [12 nylon].

Among these, polyhexamethyleneadipamide (6,6 nylon), polyhexa-methyleneazelamide (6,9 nylon) and polycaprolamide (6 nylon) are preferable.

Furthermore, for example, a polyamide which is produced from adipic acid, isophthalic acid and hexamethylenediamine can be also used, and a blend obtained by blending two or more polyamide resins, such as a mixture of 6 nylon and 6,6 nylon, can be also used.

It is preferable that the polyamide (n) has a nature excellent in the fluidity at melting, from a view point of the strength of a shaped product of the carbon fiber-reinforced resin composition. The melt flow rate (MFR) at 190° C. under a load of 1 kg according to ASTM D1238, of the polyamide (n) is preferably 5 g/10 min or more, more preferably 10 g/10 min or more, and particularly preferably 12 g/10 min or more.

[Acid-Modified Polyolefin Resin (m)]

The acid-modified polyolefin resin (m) is a polyolefin resin which is modified with an acid such as an unsaturated carboxylic acid or its derivative. The acid-modified polyolefin resin (m) improves interface strength between the carbon fiber (B) and the polymer alloy (A), and considerably improves strength properties such as breaking stress and bending strength.

Examples of the acid used in modification include an unsaturated carboxylic acid such as acrylic acid, methacrylic acid, maleic acid, fumaric acid, itaconic acid, crotonic acid, citraconic acid, sorbic acid, mesaconic acid and angelic acid. Alternatively, derivatives of these unsaturated carboxylic acids can be also used. Examples of the derivatives include an acid anhydride, an ester, an amide, an imide, and a metal salt, and specific examples thereof include maleic anhydride, itaconic anhydride, methyl acrylate, methyl methacrylate, ethyl acrylate, propyl acrylate, butyl acrylate, ethyl maleate, acrylamide, maleic acid amide, sodium acrylate and sodium methacrylate.

Among them, the unsaturated dicarboxylic acids or derivatives thereof are preferable, and maleic acid and maleic anhydride are more preferable. The unsaturated carboxylic acids or derivatives thereof may be used singly or in combination of two or more. No specific restrictions are imposed on the method of modification, and a known method may be used. For example, there are a method of dissolving a polyolefin resin in a solvent, adding an unsaturated carboxylic acid or its derivative and a radical generator, and heating and stirring the mixture, and a method of supplying respective components as described above to an extruder, and performing graft copolymerization.

The content of the acid in the acid-modified polyolefin resin (m) is preferably 0.1 to 10% by mass, more preferably 0.8 to 8% by mass. The content of the acid is obtained by measuring the IR spectrum of the resin, and determining the content from a calibration curve which was separately prepared based on the peak area at 1670 cm$^{-1}$ to 1810 cm$^{-1}$.

The limiting viscosity [q] of the acid-modified polyolefin resin (m), measured at 135° C. in tetralin, is preferably 0.1 to 3.0 dL/g. If the limiting viscosity [η] is 0.1 dL/g or more, physical properties such as strength properties etc. of a shaped product become difficult to be reduced, and if the limiting viscosity is 3.0 dL/g or less, the fluidity of the composition becomes difficult to be reduced, and the good moldability is maintained.

Particularly, it is preferable that as the acid-modified polyolefin resin (m), one or more resins selected from an acid-modified propylene-based polymer and an acid-modified ethylene-based polymer are used, and it is more preferable that one or more resins selected form a maleic acid-modified propylene-based polymer (m1) and a maleic acid-modified ethylene-based polymer (m2) are used.

No specific restrictions are imposed on the MFR at 230° C. under a load of 2.16 kg according to ASTM D1238, of the acid-modified polyolefin resin (m), and the MFR is preferably such a value that the MFR of the polymer alloy (A) is not prevented from becoming 30 to 500 g/10 min. In addition, when the acid-modified propylene-based polymer (m1) is used as the acid-modified polyolefin resin (m), the MFR of the component (m1) usually exceeds 150 g/10 min, and is preferably 200 g/10 min or more, more preferably 300 g/10 min or more, particularly preferably 500 g/10 min or more, and most preferably 600 g/10 min or more.

Particularly, when the acid-modified propylene-based polymer is used as the acid-modified polyolefin resin (m), it is preferable to use the maleic acid-modified propylene-based polymer (m1).

[Carbon Fiber (B)]

As the carbon fiber (B) used in the present invention, known various carbon fibers can be used. Specific examples thereof include carbon fibers such as polyacrylonitrile-based carbon fibers, rayon-based carbon fibers, pitch-based carbon fibers, polyvinyl alcohol-based carbon fibers, regenerated celluloses, pitch-based carbon fibers produced from mesophase pitch.

The fiber diameter of the carbon fiber (B) is preferably 3 to 30 μm, and more preferably 4 to 10 μm. Each lower limit value within the above range of the fiber diameter is significant in respect of prevention of damage of fibers or productivity of a fiber bundle. For example, in the case where a pellet is continuously produced, when the fiber diameter is moderately made to be large, the number of fibers to be bundled is not increased, the troublesome labor of connecting fiber bundles becomes unnecessary, and productivity is improved. On the other hand, each upper limit value is significant in respect that when the pellet length has been determined, reduction in an aspect ratio of the fibers is suppressed, and the reinforcing effect is maintained.

The aspect ratio of the carbon fiber (B) is preferably 5 to 6000. A lower limit value of it is significant in respect that reduction in strength is suppressed, and an upper limit value is significant in respect of moldability. The aspect ratio of the carbon fiber (B) is obtained from the mean fiber diameter and the mean fiber length according to the formula of (mean fiber length)÷(mean fiber diameter).

The carbon fiber (B) may be long fibers or short fibers, or may be chopped fibers. As the raw material of the long fibers, a continuous fiber bundle can be used, and this is commercially available as a tow. Usually, the mean fiber diameter thereof is 3 to 30 μm, and the number of filaments to be sized is 500 to 80,000. Preferably, the mean fiber diameter is 4 to 10 μm, and the number of sized filaments is 12,000 to 50,000. The length of the chopped strand is usually 1 to 20 mm, and the diameter of the fibers is usually 3 to 30 μm, and preferably 4 to 10 μm.

It is preferable that the carbon fiber (B) is in the form of a carbon fiber bundle which is obtained by sizing fibers using a sizing agent (sizing agent). Specifically, it is preferable that the carbon fibers are used in the state where many carbon fibers are integrally sized with the sizing agent. From a view point of enhancing mechanical strength, the sizing agent constituting the carbon fiber bundle is preferably an urethane-based emulsion, an epoxy-based emulsion or a nylon-based emulsion. More preferable is an emulsion-based adhesive such as an urethane-based emulsion and an epoxy-based emulsion, and particularly from a view point of more improvement in mechanical strength, an epoxy-based emulsion is most preferable. No specific restrictions are imposed on the number of carbon fibers constituting the carbon fiber bundle, and the number can be, for example, 6000 to 48000.

The surface of the carbon fiber (B) is preferably the surface which has been treated with oxidative etching, coating or the like. Examples of the oxidative etching treatment include an air oxidation treatment, an oxygen treatment, a treatment with an oxidizing gas, a treatment with ozone, a corona treatment, a flame treatment, an (atmospheric pressure) plasma treatment, and a treatment with an oxidizing liquid (nitric acid, an aqueous solution of an alkali metal salt of hypochlorous acid, potassium dichromate-sulfuric acid, potassium permanganate-sulfuric acid). Examples of the substance which covers the carbon fibers include carbon, silicon carbide, silicon dioxide, silicon, plasma monomer, ferrocene and iron trichloride. In addition, if necessary, urethane-based, olefin-based, acryl-based, nylon-based, butadiene-based and epoxy-based sizing agents may be used.

From a view point of enhancing mechanical strength, the tensile strength of the carbon fiber (B) is preferably 2500 to 6000 MPa, more preferably 3500 to 6000 MPa, and particularly preferably 4500 to 6000 MPa.

The carbon fiber-reinforced resin composition of the present invention may be a short fiber-reinforced resin pellet, or may be a long fiber-reinforced resin pellet. In the case of the short fiber-reinforced resin pellet, the pellet can be produced by melting, kneading and dispersing well the component (p), the component (m), optionally, the component (e), the component (n), and other arbitrary components as well as the carbon fiber components (B) using a roll mill, a Banbury mixer, a kneader or an extruder. The raw materials may be dry-blended by a tumbler-type blender, a Henschel mixer, a ribbon mixer or the like, and melted and kneaded with a uniaxial extruder, a biaxial extruder etc. to give a pellet-like molding material. In this method, the carbon fiber (B) may be placed from either a top or a side of the extruder. In addition, in this method, all or a part of respective components of the polymer alloy (A) may be separately melted and kneaded, and melted and kneaded with the carbon fiber (B).

On the other hand, when the carbon fiber-reinforced resin composition of the present invention is the long fiber-reinforced resin pellet, the pellet can be produced by a known method such as a pultrusion method. A part of the aforementioned components may be separately melted and kneaded, and then melted and kneaded with the others. For example, the carbon fiber roving is guided into an impregnation die, then it is uniformly impregnated with the melted resin between filaments, and then it is cut into the necessary length (2 to 200 mm) to be pelletized.

A variety of additives, for example, additives for modification such as a dispersant, a lubricant, a plasticizer, a flame retardant, an antioxidant (a phenol-based antioxidant, a phosphorus antioxidant, a sulfur-based antioxidant etc.), an antistatic agent, a light stabilizer, an ultraviolet absorbing agent, a crystallization promoting agent (a nucleating agent etc.), a foaming agent, a crosslinking agent and an antibacterial agent; coloring agents such as a pigment and a dye; particulate fillers such as carbon black, titanium oxide, rouge, an azo pigment, an anthraquinone pigment, phthalocyanine, talc, calcium carbonate, mica and clay; short fiber-like fillers such as wollastonite; whiskers such as potassium titanate; may be added to the carbon fiber-reinforced resin composition of the present invention, depending on the intended purpose.

The shaped product of the present of invention is characterized in that the fiber-reinforced resin composition of the present invention as illustrated above is molded. As the molding method, known molding methods such as an injection molding method, an extrusion molding method, a hollow molding method, a compression molding method, an injection compression molding method, an injection molding method by gas injection and a foaming injection molding method can be applied without any restriction. Particularly, the injection molding method, the compression molding method and the injection compression molding method are preferable.

EXAMPLES

Then, the present invention will be illustrated by way of examples, but the present invention is not restricted by them. First, raw materials used in Examples and Comparative Examples are shown below.

[Carbon Fiber (B)]

The following three kinds of short fibers manufactured by Toho Tenax Co., Ltd. "TENAX (registered trademark) Chopped Fiber" (CF-1~CF-3) and the following filament "TANAX (registered trademark) Filament Yarn" (CF-4) were used. In addition, in Comparative Example 1-2, the following glass fibers (GF-1) manufactured by Central Glass Fiber Co., Ltd. were used.

"CF-1": HT C251; fiber length=6 mm, epoxy content=1.3% by mass
"CF-2": HT C227; fiber length=6 mm, epoxy content=7.0% by mass
"CF-3": HT C261; fiber length=3 mm, epoxy content=1.3% by mass
"CF-4": HTS40 12K; number of filaments=12000, epoxy content=1.3% by mass)
GF-1: fiber length=3 mm

[Propylene-Based Polymer (p)]

The following propylene-ethylene block copolymer (b-PP) and the following four kinds of propylene homopolymers (h-PP (1)~h-PP (4)) manufactured by Prime Polymer Co., Ltd. were used.

"b-PP": X855; MFR according to ASTM D1238 (the same shall apply hereinafter) (230° C., 2.16 kg)=15 g/10 min, 25° C. xylene-soluble part amount=23% by mass, limiting viscosity of 25° C. xylene-soluble part [η]=7.4 dl/g, ethylene content of 25° C. xylene-soluble part=39 mol %
"h-PP (1)": MFR (230° C., 2.16 kg)=15 g/10 min
"h-PP (2)": MFR (230° C., 2.16 kg)=50 g/10 min
"h-PP (3)": MFR (230° C., 2.16 kg)=63 g/10 min
"h-PP (4)": MFR (230° C., 2.16 kg)=220 g/10 min

[Ethylene-Based Copolymer (e)]

The following two kinds of ethylene-1-butene copolymers manufactured by Mitsui Chemicals, Inc. "TAFMER (registered trademark)" (e-1~e-2) were used.

"e-1": DF940; ethylene content=90 mol %, MFR (230° C., 2.16 kg)=6.7 g/10 min
"e-2": DF7350; density=870 kg/m$^3$, MFR (230° C., 2.16 kg)=65 g/10 min, melting point=55° C.

[Polyamide (n)]

The following three kinds of polyamide 12(s) manufactured by Ube Industries, Ltd. "UBESTA (registered trademark)" (PA-1~PA-3) were used.

"PA-1": 3012U; melting point according to ISO11357-3 (the same shall apply hereinafter)=180° C., MFR according to ISO11357-3 (the same shall apply hereinafter) (190° C., 1.0 kg)=17 g/10 min
"PA-2": 3014U; melting point=179° C., MFR (190° C., 1.0 kg)=9 g/10 min
"PA-3": 3020U; melting point=178° C., MFR (235° C., 2.16 kg)=20 g/10 min

[Acid-Modified Polyolefin Resin (m)]

The following maleic-acid modified random polypropylene manufactured by Mitsui Chemicals, Inc. "ADMER (registered trademark) QE800" (m1-1), maleic anhydride-modified polypropylene (m1-2) prepared by the following method, and the following maleic acid-modified ethylene-based polymer manufactured by Mitsui Chemicals, Inc. "TAFMER (registered trademark) MH5020" (m2) were used.

"m1-1": MFR according to ASTM D1238 (the same shall apply hereinafter) (230° C., 2.16 kg)=9.0 g/10 min
"m1-2": Into 100 parts by mass of polypropylene (manufactured by Prime Polymer Co., Ltd., tradename J106G, MFR (230° C., 2.16 kg)=15 g/10 min) were pre-mixed with 1 mass part of dialkyl peroxide (manufactured by NOF CORPORATION, Perhexa (registered trademark) 25B) and 3 parts by mass of powdered maleic anhydride (manufactured by NOF CORPORATION, CRYSTAL MAN (registered trademark)). This mixture was supplied to a 30 mm φ biaxial extruder, a temperature of which had been regulated at 190° C., and melted and kneaded at 200 rpm to obtain a strand, which was then cooled in a water tank to obtain maleic anhydride-modified polypropylene. In order to remove unmodified remaining maleic anhydride, this maleic anhydride-modified polypropylene was vacuum-dried at 40° C. for 2 hours. The content of maleic acid of the resulting maleic anhydride-modified polypropylene (m1-2) was 2.5% by mass, and the MFR (230° C., 2.16 Kg) was 800 g/10 min.
"m2": MFR (230° C., 2.16 Kg)=1.2 g/10 min

Example 1-1

<Assessing Method 1 (DSM Method)>

A component (n), a component (m1), a component (m2), a component (p), a component (e) and a component (B) in amounts shown in Table 1 were placed in this order into a kneading potion having a volume of 100 cc of a kneading device (manufactured by Toyo Seiki Seisaku-Sho, Ltd., Labo Plastomill (registered trademark) 75C100), the roller rotation number of which was set at 5 rpm and the temperature of which was set at 180° C., and after completion of placement, the set temperature was raised up to 190° C. Then, an operation of increasing the roller rotation number to 10→30→50→70→90 rpm at an interval of 10 seconds was repeated three times. Thereafter, kneading was performed at 30 rpm for 10 minutes, then, the kneaded product was taken out from the mill, and the massy kneaded product was pressed with a simple pressing machine to obtain a sheet-like carbon fiber-reinforced resin composition having a thickness of around 2 mm.

The above-described sheet-like carbon fiber-reinforced resin composition was cut into small pieces with a cutter, placed into a hopper portion of a small kneading machine (DSM Xplore MC15M) of a resin kneading and molding assessing apparatus (manufactured by Xplore Instruments) and kneaded at 180° C. for 3 minutes. Thereafter, the kneaded product was immediately placed into a pot portion (220° C.) of an injection molding machine for manufacturing a test piece (DSM Xplore IM12M), and injection-molded into a mold at 30 to 40° C. under a pressure of 9 MPa (primary) and 12 MPa (secondary), and this was retained for 35 seconds to manufacture a dumb-bell-type test piece according to JIS K 7162 1994. Then, a tensile test was performed under the conditions of a tensile speed of 50 mm/min and a distance between chucks of 50 mm. The results of the tensile yield stress (YS) (MPa), the tensile elongation at breakage (%) and the tensile elastic modulus (apparent tensile elastic modulus) (GPa) in a stress-strain curve are shown in Table 1.

<Assessing Method 2 (Plate Excising Method)>

A component (n), a component (m1), a component (m2), a component (p), a component (e) and a component (B) in amounts shown in Table 1 were placed in this order into a hopper of a screw-type extruder, a temperature of which had been regulated at 250° C. In addition, the component (B) was extended and opened at such a speed that the amount of the component (B) became 100 parts by mass, supplied to a die head of the extruder, stranded, cooled to solidify, and pelletized with a strand cutter to obtain a pellet-like carbon fiber-reinforced resin composition.

The above-described pellet-like carbon fiber-reinforced resin composition was placed into an injection molding machine at a cylinder temperature of 250° C. and a clamping pressure of 100 t, and a mold of 120 mm×120 mm×3 mm was used to obtain a plate-like shaped product. This plate-like shaped product was used according to JIS K 7162IBA (ISO527-2) to make an excised test piece. Regarding the excised test piece, a bending test was performed according to ISO178, and the bending elastic modulus (GPa) and the bending strength (MPa) in a stress-strain curve were obtained. In addition, regarding the excised test piece, a Charpy impact test was performed according to JIS K7111 (test piece size=10 mm×80 mm×4 mm, notch=machining), and the Charpy impact strength (kJ/m$^2$) at 23° C. was obtained. The results are shown in Table 1.

<Actually Measured MFR>

The melt flow rate (MFR) of the component (A) was measured at 230° C. under a load of 2.16 kg according to ASTM D1238. The results are shown in Table 1.

Example 1-2

According to the same manner as that of Example 1-1 except that CF-1 as the component (B) was changed to CF-2, assessment was performed. The results are shown in Table 1.

Example 1-3

According to the same manner as that of Example 1-1 except that CF-1 as the component (B) was changed to CF-3, assessment was performed. The results are shown in Table 1.

Comparative Example 1-1

According to the same manner as that of Example 1-1 except that the component (B) was not used, assessment was performed. The results are shown in Table 1.

Comparative Example 1-2

According to the same manner as that of Example 1-1 except that CF-1 as the component (B) was changed to GF-1, assessment was performed. The results are shown in Table 1. In the present Comparative Example, tensile yield stress and tensile elastic modulus exhibited somewhat great values as compared with Comparative Example 1-1 using no fibers, but mechanical properties were inferior as compared with Examples 1-1 to 1-3 using the carbon fibers.

TABLE 1

| | | | | Ex. 1-1 | Ex. 1-2 | Ex. 1-3 | Comp. Ex. 1-1 | Comp. Ex. 1-2 |
|---|---|---|---|---|---|---|---|---|
| Component (B) parts by mass with respect to 100 parts by mass of component (A) | | CF-1 | [parts by mass] | 6 | | | | |
| | | CF-2 | [parts by mass] | | 6 | | | |
| | | CF-3 | [parts by mass] | | | 6 | | |
| | | CF-4 | [parts by mass] | | | | | |
| | | G F | [parts by mass] | | | | | 6 |
| Component (A) | Component (p) | b-PP | [% by mass] | 35 | 35 | 35 | 35 | 35 |
| | | h-PP (1) | [% by mass] | | | | | |
| | | h-PP (2) | [% by mass] | | | | | |
| | | h-PP (3) | [% by mass] | | | | | |
| | | h-PP (4) | [% by mass] | | | | | |
| | Component (e) | e-1 | [% by mass] | 12 | 12 | 12 | 12 | 12 |
| | | e-2 | [% by mass] | | | | | |
| | Component (m) | m1-1 | [% by mass] | 18 | 18 | 18 | 18 | 18 |
| | | m1-2 | [% by mass] | | | | | |
| | | m2 | [% by mass] | 12 | 12 | 12 | 12 | 12 |
| | Component (n) | PA-1 | [% by mass] | | | | | |
| | | PA-2 | [% by mass] | | | | | |
| | | PA-3 | [% by mass] | 23 | 23 | 23 | 23 | 23 |
| (Total) | | | [% by mass] | 100 | 100 | 100 | 100 | 100 |
| $W_p + W_m$ | | | [% bymass] | | | 65 | | |
| $W_p/W_m$ | | | [—] | | | 55/45 | | |
| Actually measured MFR of component (A) (230° C., load 2.16 kg) | | | [g/10 min] | | | 1.2 | | |
| MFR calculated from formula (1) left side (230° C., load 2.16 kg) | | | [g/10 min] | | | 13 | | |
| Assessing method 1 (DSM method) | | Tensile yield stress | [MPa] | 34 | 33 | 34 | 24 | 28 |
| | | Tensile elongation at breakage | [%] | 20 | 18 | 18 | 220 | 120 |
| | | Tensile elastic modulus | [GPa] | 1.8 | 1.8 | 1.9 | 0.8 | 1.1 |

TABLE 1-continued

|  |  |  | Ex. 1-1 | Ex. 1-2 | Ex. 1-3 | Comp. Ex. 1-1 | Comp. Ex. 1-2 |
|---|---|---|---|---|---|---|---|
| Assessing method 2 (Plate excising method) | Bending elastic modulus | [GP] | 1.9 | 1.8 | 1.9 | — | — |
|  | Bending strength | [MPa] | — | — | — | — | — |
|  | Charpy impact strength | [kJ/m²] | 11 | 10 | 11 | — | — |

Example 2-1

According to the same manner as that of Example 1-1 except that the component (p), the component (m) and the component (B) in amounts shown in Table 2 were placed into Labo Plastomill (registered trademark) in this order, the same test piece as that of the assessing method 1 in Example 1-1 was made, a tensile test was performed, and the tensile elastic modulus (GPa) and the tensile strength (MPa) in a stress-strain curve were obtained. In addition, the MFR (230° C., 2.16 kg) of the component (A) was also measured. The results are shown in Table 2.

Comparative Example 2-1

According to the same manner as that of Example 2-1 except that the component (m) was not used and the amounts of respective components were changed as shown in Table 2, molding of a test piece was tried. However, since the carbon fiber was not uniformly melted and kneaded, molding could not be performed.

Example 2-2

According to the same manner as that of Example 2-1 except that h-PP (4) was used as the component (p), the component (n) was used concurrently, and the amounts of respective components were changed as shown in Table 2, a test piece was made, and assessed. The results are shown in Table 2. In the present Example, despite the fact that the content of the carbon fibers (component (B)) was lower than that of Example 2-1, higher tensile properties were exhibited. Further, the MFR of the polymer alloy (A) of the present example exhibited a high value of 250 g/10 min, and from this, it was seen that the test piece is easily melted and kneaded (the carbon fibers were sufficiently impregnated at the low feed energy amount).

Example 2-3

According to the same manner as that of Example 2-2 except that h-PP (3) was used as the component (p), a test piece was made and assessed. The results are shown in Table 2. In the present Example, since the MFR of the component (p) was slightly lower as compared with Example 2-2, it was seen that tensile properties also tend to be reduced. However, this is practically the level having no problem.

Reference Example 2-1

According to the same manner as that of Example 2-2 except that h-PP (1) was used as the component (p), a test piece was made and assessed. The results are shown in Table 2. In the present Reference Example, since the MFR of the component (p) was considerably lower as compared with Example 2-2, the MFR of the polymer alloy (A) was also considerably reduced, and tensile properties were reduced to a degree that an improvement is practically desirable.

Example 2-4

According to the same manner as that of Example 2-1 except that h-PP (4) as the component (p), the component (m), the component (n) and the component (B) were used in amounts shown in Table 2, the same test piece as that of the assessing method 1 was made and assessed. In addition, the same test piece as that of the assessing method 2 of Example 1-1 was also made, and the bending elastic modulus (GPa), the bending strength (MPa) and the Charpy impact strength (kJ/m²) were measured. Further, regarding the test piece of the assessing method 2, a tensile test was performed at a tensile speed of 5 mm/min, and the tensile elastic modulus (GPa) and the tensile strength (MPa) in a stress-strain curve were also measured. The results are shown in Table 2.

Example 2-5

According to the same manner as that of Example 2-4 except that h-PP (3) was used as the component (p), and the amounts of respective components were changed as shown in Table 2, a test piece was made and assessed. The results are shown in Table 2. Since the MFR of the component (p) was slightly lower in the present Example as compared with Example 2-4, it was seen that tensile properties and bending properties tend to be reduced. However, this is practically the level having no problem.

Reference Example 2-2

According to the same manner as that of Example 2-4 except that h-PP (1) was used as the component (p), a test piece of the assessing method 2 was made and assessed (provided that Charpy impact strength is excluded). The results are shown in Table 2. In the present Reference Example, since the MFR of the component (p) was considerably lower as compared with Example 2-4, the MFR of the polymer alloy (A) was also considerably reduced, and tensile properties were reduced to a degree that an improvement is practically desirable.

Example 3-1

According to the same manner as that of Example 2-4 except that b-PP as the component (p), the component (e), the component (m), the component (n) and the component (B) were used in amounts shown in Table 2, a test piece of the assessing method 2 was made and assessed. The results are shown in Table 2. In the present Example, tensile properties and bending properties were lower than those of Examples 2-4 and 2-5 using h-PP, but the Charpy impact strength was greatly improved.

Example 3-2

According to the same manner as that of Example 3-1 except that the amount of the component (B) was increased as shown in Table 2, a test piece of the assessing method 2 was made and assessed. The results are shown in Table 2. In the present Example, since the amount of the carbon fiber (component (B)) was larger than that of Example 3-1, not only were tensile properties and bending properties improved, but also the impact resistance (Charpy impact strength) was improved by 30 to 40%.

TABLE 2

| | | | Comp. Ex. 2-1 | Ex. 2-1 | Ex. 2-2 | Ex. 2-3 | Ref. Ex. 2-1 | Ex. 2-4 | Ex. 2-5 | Ref. Ex. 2-2 | Ex. 3-1 | Ex. 3-2 |
|---|---|---|---|---|---|---|---|---|---|---|---|---|
| Component (B) parts by mass with respect to 100 parts by mass of component (A) | | CF-1 [parts by mass] | | | | | | | | | | |
| | | CF-2 [parts by mass] | | | | | | | | | | |
| | | CF-3 [parts by mass] | 67 | 67 | 10 | 10 | 10 | | | | 26 | 64 |
| | | CF-4 [parts by mass] | | | | | | 67 | 67 | 67 | | |
| | | G F [parts by mass] | | | | | | | | | | |
| Component (A) | Component (p) | b-PP [% by mass] | | | | | | | | | | |
| | | h-PP (1) [% by mass] | | | | | | 76 | | 66 | | |
| | | h-PP (2) [% by mass] | 90 | 100 | | | | | | | | |
| | | h-PP (3) [% by mass] | | | 76 | | | | 76 | | 24 | 24 |
| | | h-PP (4) [% by mass] | | | | 76 | | | 66 | | | |
| | Component (e) | e-1 [% by mass] | | | | | | | | | | |
| | | e-2 [% by mass] | | | | | | | | | 12 | 12 |
| | Component (m) | m1-1 [% by mass] | | | | | | | | | | |
| | | m1-2 [% by mass] | 10 | | 14 | 14 | 14 | 12 | 14 | 12 | 3 | 3 |
| | | m2 [% by mass] | | | | | | | | | 12 | 12 |
| | Component (n) | PA-1 [% by mass] | | | | | 10 | 10 | 10 | 22 | 10 | 22 |
| | | PA-2 [% by mass] | | | | | | | | | 14 | 14 |
| | | PA-3 [% by mass] | | | | | | | | | | |
| (Total) | | [% by mass] | 100 | 100 | 100 | 100 | 100 | 100 | 100 | 100 | 100 | 100 |
| $W_p + W_m$ | | [% by mass] | 100 | 100 | 90 | 90 | 90 | 78 | 90 | 78 | 74 | |
| $W_p/W_m$ | | [—] | | | | | | | | | | |
| Actually measured MFR of component (A) (230° C., load 2.16 kg) | | [g/10 min] | 50 | 48 | 250 | 60 | 20 | 160 | 60 | 20 | 7 | |
| MFR calculated from formula (1) left side (230° C., load 2.16 kg) | | [g/10 min] | 66 | 50 | 267 | 92 | 28 | 267 | 92 | 27 | 32 | |
| Assessing method 1 (DSM method) | Tensile elastic modulus | [GPa] | 10.7 | Unmoldable | 4.5 | 4.2 | 3.0 | 10.5 | 7.0 | — | — | — |
| | Tensile strength | [MPa] | 130 | | 78 | 71 | 48 | 126 | 115 | — | — | — |
| Assessing method 2 (Plate excising method) | Tensile strength modulus | [GPa] | — | — | — | — | — | 7.9 | 7.2 | 5.5 | 3.7 | 5.2 |
| | Tensile strength | [MPa] | — | — | — | — | — | 134 | 138 | 90 | 68 | 74 |
| | Bending elastic modulus | [GPa] | — | — | — | — | — | 17.4 | 17.1 | 12.5 | 6.0 | 10.0 |
| | Bending strength | [MPa] | — | — | — | — | — | 213 | 218 | 160 | 99 | 112 |
| | Charpy impact strength | [kJ/m²] | — | — | — | — | — | 8 | 10 | — | 17 | 23 |

The invention claimed is:

1. A carbon fiber-reinforced resin composition, comprising:

100 parts by mass of a polymer alloy (A) which comprises:

25 to 95% by mass of one or more propylene-based polymers (p) selected from a propylene-ethylene block copolymer, a propylene homopolymer and a propylene-ethylene random copolymer having an ethylene content of 5% by mass or less, 1 to 60% by mass of an acid-modified polyolefin resin (m), 0 to 40% by mass of an ethylene-based polymer (e) and 0 to 50% by mass of a polyamide (n)

wherein the total of the component (p), the component (m), the component (e) and the component (n) is 100% by mass, and 1 to 200 parts by mass of a carbon fiber (B);

the acid-modified polyolefin resin (m) comprises a maleic acid-modified propylene-based polymer (m1);

the total of $W_p$ and $W_{m1}$ is 50 to 98% by mass, in which the content of the component (p) is expressed by $W_p$ % by mass, the content of the component (m1) is expressed by Wm1% by mass (the content of the whole component (m) is expressed by Wm % by mass), the content of the component (e) is expressed by $W_e$ % by mass, and the content of the component (n) is expressed by $W_n$ % by mass in the polymer alloy (A), and the total of Wp, Wm, We and Wn is 100% by mass; and additionally; and, the following formula (1):

$$Q_P \times \log(MFR_P) + Q_{m1} \times \log(MFR_{m1}) > \log 120 \quad (1)$$

wherein, $Q_P = W_P/(W_P + W_{m1})$, $Q_{m1} = W_{m1}/(W_P + W_{m1})$ is satisfied in which the melt flow rate (MFR) of the component (p) measured at 230° C. under a load of 2.16 kg according to ASTM D1238 is expressed by $MFR_p$ (g/10 min) and the melt flow rate (MFR) of the component (m1) measured at 230° C. under a load of 2.16 kg according to ASTM D1238 is expressed by $MFR_{m1}$ (g/10 min); and, wherein the melt flow rate MFR of the polymer alloy (A), measured at 230° C. under a load of 2.16 kg according to ASTM D1238, is 30 to 500 g/10 min.

2. The carbon fiber-reinforced resin composition according to claim 1, wherein the composition comprises 100 parts by mass of the polymer alloy (A) and 1 to 80 parts by mass of the carbon fiber (B).

3. The carbon fiber-reinforced resin composition according to claim 1, wherein the total of $W_p$ and $W_m$ is 50 to 100% by mass, $W_n$ is 0 to 50% by mass, and the ratio of Wp and Wm (Wp/Wm) is 70/30 to 98/2, in which the content of the component (p) is expressed by $W_p$ % by mass, the content of the component (m) is expressed by $W_m$ % by mass, the content of the component (e) is expressed by $W_e$ % by mass, and the content of the component (n) is expressed by $W_n$ % by mass in the polymer alloy (A), and the total of $W_p$, $W_m$, $W_e$ and $W_n$ is 100% by mass.

4. The carbon fiber-reinforced resin composition according to claim 1, wherein the acid-modified polyolefin resin (m) additionally comprises a maleic acid-modified ethylene-based polymer (m2).

5. The carbon fiber-reinforced resin composition according to claim 1, wherein the acid-modified polyolefin resin (m) comprises a maleic acid-modified propylene-based polymer (m1), and the melt flow rate (MFR) of the maleic acid-modified propylene-based polymer (m1), measured at 230° C. under a load of 2.16 kg according to ASTM D1238, exceeds 150 g/10 min.

6. The carbon fiber-reinforced resin composition according to claim 1, wherein the carbon fiber (B) is in the form of a carbon fiber bundle which has been sized using a sizing agent, and the sizing agent is an epoxy-based emulsion.

7. A shaped product, which is obtained by molding the carbon fiber-reinforced resin composition according to claim 1.

* * * * *